US012627607B2

(12) United States Patent
Wu et al.

(10) Patent No.: US 12,627,607 B2
(45) Date of Patent: *May 12, 2026

(54) CV2X SITUATIONALLY-DEPENDENT SERVICE PRIORITIZATION

(71) Applicant: QUALCOMM Incorporated, San Diego, CA (US)

(72) Inventors: Zhibin Wu, Los Altos, CA (US); Dan Vassilovski, Del Mar, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 18/486,334

(22) Filed: Oct. 13, 2023

(65) Prior Publication Data

US 2024/0039855 A1      Feb. 1, 2024

Related U.S. Application Data

(63) Continuation of application No. 17/186,531, filed on Feb. 26, 2021, now Pat. No. 11,838,213.

(51) Int. Cl.
| | |
|---|---|
| *H04L 47/24* | (2022.01) |
| *H04L 47/28* | (2022.01) |
| *H04W 4/40* | (2018.01) |
| *H04W 28/02* | (2009.01) |
| *G08G 1/01* | (2006.01) |

(Continued)

(52) U.S. Cl.
CPC .............. *H04L 47/24* (2013.01); *H04L 47/28* (2013.01); *H04W 4/40* (2018.02); *H04W*

28/0231 (2013.01); *G08G 1/0104* (2013.01); *H04W 4/80* (2018.02); *H04W 4/90* (2018.02)

(58) Field of Classification Search
None
See application file for complete search history.

(56) References Cited

U.S. PATENT DOCUMENTS

| | | | |
|---|---|---|---|
| 10,528,043 B2 * | 1/2020 | O'Laughlin | ............. G08G 5/21 |
| 2012/0127928 A1 * | 5/2012 | Ichihara | .............. H04L 12/6418 |
| | | | 370/328 |

(Continued)

FOREIGN PATENT DOCUMENTS

| | | |
|---|---|---|
| CN | 111354206 A | 6/2020 |
| WO | 2019226098 A1 | 11/2019 |

OTHER PUBLICATIONS

GSMA: "Cellular Vehicle-to-Everything (C-V2X) Enabling Intelligent Transport", Mar. 10, 2020 (Mar. 10, 2020), 20 Pages, XP055910434, Retrieved from the Internet: URL: https://www.gsma.com/iot/wp-content/uploads/2017/12/C-2VX-Enabling-Intelligent-Transport_2.pdf [retrieved on Apr. 7, 2022], The whole document.

(Continued)

*Primary Examiner* — Eunsook Choi
(74) *Attorney, Agent, or Firm* — Holland & Hart LLP

(57)      ABSTRACT

Techniques are providing for situationally-dependent service prioritization in a CV2X network. An example method of prioritizing data packets with a mobile device includes determining a range to a waypoint, determining an estimated time of arrival at the waypoint, computing a priority value based at least in part on the estimated time of arrival at the waypoint, and generating a data packet based on the priority value.

30 Claims, 8 Drawing Sheets

(51) Int. Cl.
  *H04W 4/80*       (2018.01)
  *H04W 4/90*       (2018.01)

(56)                References Cited

U.S. PATENT DOCUMENTS

| | | | |
|---|---|---|---|
| 2012/0236841 A1* | 9/2012 | Nakaoka | G08G 1/161 |
| | | | 370/345 |
| 2017/0358222 A1 | 12/2017 | Schubert | |
| 2018/0042039 A1 | 2/2018 | Senba et al. | |
| 2020/0322830 A1* | 10/2020 | Nagamura | H04W 4/48 |
| 2020/0344637 A1 | 10/2020 | Kim et al. | |
| 2020/0365033 A1* | 11/2020 | Cheng | G08G 1/0145 |
| 2020/0396719 A1* | 12/2020 | Sheu | H04W 72/02 |
| 2021/0248905 A1* | 8/2021 | Edwardson | H04W 4/44 |
| 2021/0327265 A1* | 10/2021 | Schulte | G01S 19/14 |
| 2022/0013008 A1* | 1/2022 | Katz | G08G 1/0116 |
| 2022/0141702 A1* | 5/2022 | Ali | H04W 28/0268 |
| | | | 370/229 |
| 2022/0278933 A1 | 9/2022 | Wu et al. | |

OTHER PUBLICATIONS

Intel Corporation: "Design Options to Support Priority for V2V Communication", 3GPP TSG RAN WG1 Meeting #85, R1-164139 Intel—V2V Priority, 3rd Generation Partnership Project, Mobile Competence Centre, 650, Route Des Lucioles, F-06921 Sophia-Antipolis Cedex, France, vol. RAN WG1, No. Nanjing, China, May 23, 2016-May 27, 2016, May 14, 2016, pp. 1-6, XP051096575.

International Preliminary Report on Patentability—PCT/US2022/011214—The International Bureau of WIPO—Geneva, Switzerland—Sep. 7, 2023.

International Search Report and Written Opinion—PCT/US2022/011214—ISA/EPO—Apr. 21, 2022.

* cited by examiner

600

602    604    606

| Distance | ETA (sec) | Priority |
|----------|-----------|----------|
| >1000m | >600 | 6 (Default) |
| <1000m | <220 | 5 |
| <1000m | <90 | 4 |
| <1000m | <65 | 3 |
| <1000m | <50 | 2 |
| <1000m | <40 | 1 |
| <50m | -- | 1 |
| <1000m | N/A | 4 |
| >1000m | N/A | 6 (Default) |

702 — Determine a range to a waypoint

704 — Determine an estimated time of arrival at the waypoint

706 — Compute a priority value based at least in part on the estimated time of arrival at the waypoint 708 — Generate a data packet based on the priority value

800

802 — Determine a current location of a mobile device

804 — Estimate a time that the mobile device will arrive at a waypoint

806 — Compute a priority value based at least in part on the estimated time the mobile device will arrive at the waypoint 808 — Generate a data packet based on the priority value 810 — Transmit the data packet to the mobile device

CV2X SITUATIONALLY-DEPENDENT SERVICE PRIORITIZATION

CROSS-REFERENCE TO RELATED APPLICATIONS

This application is a continuation of U.S. patent application Ser. No. 17/186,531, filed on Feb. 26, 2021, entitled "CV2X SITUATIONALLY-DEPENDENT SERVICE PRIORITIZATION," which is assigned to the assignee hereof, and the entire contents of which are hereby incorporated herein by reference for all purposes.

BACKGROUND

The connected-vehicle radio-frequency environment is a spectrum-limited, bandwidth-limited resource. For example, the available spectrum may be about 20 MHz at just under 6 GHz. This spectrum may be increasingly used as more radio-frequency-based connected-vehicle (e.g., cellular vehicle to everything (CV2X)) message exchanges occur. CV2X technology uses cellular and vehicular communication systems to exchange information between vehicles and other entities, to include roadside units (RSUs) and edge servers. CV2X can be used to improve vehicle safety and to eliminate the excessive societal and property damage cost of traffic collisions. In some cases, CV2X systems may send warning messages. In high traffic areas, such as busy intersections, the limited bandwidth and processing capabilities of a mobile device, RSU, or an edge server may be inadequate to provide the necessary warning messages to the vehicles at the intersection.

SUMMARY

An example method of prioritizing data packets with a mobile device according to the disclosure includes determining a range to a waypoint, determining an estimated time of arrival at the waypoint, computing a priority value based at least in part on the estimated time of arrival at the waypoint, and generating a data packet based on the priority value.

Implementations of such a method may include one or more of the following features. The waypoint may be included in map data received by the mobile device. Computing the priority value may include obtaining the priority value from a look-up table based on the estimated time of arrival and the range to the waypoint. An environmental condition may be determined such that the priority value is based at least in part on the environmental condition. A road condition may be determined such that the priority value is based at least in part on the road condition. The data packet may be associated with a long-term evolution communication interface and generating the data packet may include setting a ProSe Per-Packet Priority value based on the priority value. The data packet may be associated with a 5G new radio communication interface and generating the data packet may include setting a PQI value based on the priority value. The data packet may be associated with a dedicated short-rage communication wireless communication channel. The method may include transmitting the data packet to a roadside unit associated with the waypoint and/or to a cellular base station. The waypoint may be a dynamic waypoint. The dynamic waypoint may be an emergency vehicle.

An example apparatus according to the disclosure includes a memory, at least one transceiver, at least one processor communicatively coupled to the memory and the at least one transceiver, and configured to determine a range to a waypoint, determine an estimated time of arrival at the waypoint, compute a priority value based at least in part on the estimated time of arrival at the waypoint, and generate a data packet based on the priority value.

Implementations of such an apparatus may include one or more of the following features. The at least one processor may be further configured to receive map data, such that the waypoint is included in the map data. The at least one processor may be further configured to obtain the priority value from a look-up table based on the estimated time of arrival and the range to the waypoint. The at least one processor may be further configured to determine an environmental condition such that the priority value is based at least in part on the environmental condition. The at least one processor may be further configured to determine a road condition such that the priority value is based at least in part on the road condition. The data packet may be associated with a long-term evolution communication interface and the at least on processor may be further configured to set a ProSe Per-Packet Priority value based on the priority value. The data packet may be associated with a 5G new radio communication interface and the at least one processor may be further configured to set a PQI value based on the priority value. The data packet may be associated with a dedicated short-rage communication wireless communication channel. The at least one processor may be further configured to transmit the data packet to a roadside unit associated with the waypoint. The at least one processor may be further configured to transmit the data packet to a cellular base station. The waypoint may be a dynamic waypoint, and the dynamic waypoint may be an emergency vehicle.

An example apparatus for prioritizing data packets according to the disclosure includes means for determining a range to a waypoint, means for determining an estimated time of arrival at the waypoint, means for computing a priority value based at least in part on the estimated time of arrival at the waypoint, and means for generating a data packet based on the priority value.

An example non-transitory processor-readable storage medium comprising processor-readable instructions configured to cause one or more processors to prioritize data packets according to the disclosure includes code for determining a range to a waypoint, code for determining an estimated time of arrival at the waypoint, code for computing a priority value based at least in part on the estimated time of arrival at the waypoint, and generating a data packet based on the priority value.

An example method of prioritizing data packets with a networked server according to the disclosure includes determining a current location of a mobile device, estimating a time the mobile device will arrive at a waypoint, computing a priority value based at least in part on the estimated time the mobile device will arrive at the waypoint, generating a data packet based on the priority value, and transmitting the data packet to the mobile device.

Implementations of such a method may include one or more of the following features. The waypoint may be included in map data received by the networked server. Computing the priority value may include obtaining the priority value from a look-up table based at least in part on the estimated the mobile device will arrive at the waypoint. Computing the priority value may include obtaining the priority value from the look-up table based at least in part on a range between the mobile device and the waypoint. An environmental condition may be determined such that computing the priority value is based at least in part on the environmental condition. A road condition, such that computing the priority value is based at least in part on the road condition. The data packet may be associated with a long-term evolution communication interface and generating the data packet may include setting a ProSe Per-Packet Priority value based on the priority value. The data packet may be associated with a 5G new radio communication interface and generating the data packet may include setting a PQI value based on the priority value. The data packet may be associated with a dedicated short-rage communication wireless communication channel. The networked server may be a roadside unit in a vehicle-to-everything network. The waypoint may be received from another networked server. The waypoint may be a dynamic waypoint.

An example apparatus according to the disclosure includes a memory, at least one transceiver, at least one processor communicatively coupled to the memory and the at least one transceiver, and configured to determine a current location of a mobile device, estimate a time the mobile device will arrive at a waypoint, compute a priority value based at least in part on the estimated time the mobile device will arrive at the waypoint, generate a data packet based on the priority value, and transmit the data packet to the mobile device.

An example non-transitory processor-readable storage medium comprising processor-readable instructions configured to prioritize data packets according to the disclosure includes code for determining a current location of a mobile device, code for estimating a time the mobile device will arrive at a waypoint, code for computing a priority value based at least in part on the estimated time the mobile device will arrive at the waypoint, code for generating a data packet based on the priority value, and code for transmitting the data packet to the mobile device.

An example apparatus for prioritizing data packets according to the disclosure includes means for determining a current location of a mobile device, means for estimating a time the mobile device will arrive at a waypoint, means for computing a priority value based at least in part on the estimated time the mobile device will arrive at the waypoint, means for generating a data packet based on the priority value, and means for transmitting the data packet to the mobile device.

Items and/or techniques described herein may provide one or more of the following capabilities, as well as other capabilities not mentioned. A static or dynamic waypoint information may be identified. The waypoint information may be included in map data provided to a vehicle. A threshold region may be included with the waypoint information. A relative distance between a vehicle and the waypoint information may be determined. The vehicles estimated time of arrival at the waypoint or the threshold region may be determined. The vehicle may communicate with a CV2X network via established interfaces including the PC5 interface and the Uu interface. A user equipment (UE) (e.g., the vehicle) receiving CV2X communication data packets may prioritize the packets and the associated CV2X service based on the distance and/or time of arrival at the waypoint information. The priority level may change as the vehicle approaches the waypoint, and then change again as the vehicle departs from the waypoint. The priority level may change based on the actions of other vehicles proximate to the waypoint. The data packet prioritization levels of the data packets may be changed by the vehicle, a roadside unit, or an edge server. Other capabilities may be provided and not every implementation according to the disclosure must provide any, let alone all, of the capabilities discussed. It may be possible for an effect noted above to be achieved by means other than that noted, and a noted item/technique may not necessarily yield the noted effect.

DETAILED DESCRIPTION

Techniques are discussed herein for providing situationally-dependent service prioritization in a CV2X network. Vehicles (i.e., UEs) participating in a CV2X network utilize network resources to provide services including sending and receiving control and status messages. In crowded areas, such as congested intersections, the UEs may utilize more resources than are actually required for efficient vehicle control and operator alerts. The proposed situationally-dependent service prioritization utilizes logical functions within a CV2X entity to elevate or lower the priority of CV2X services. For example, different CV2X services may have dependences on vehicle dynamic parameters, including vehicle location and direction of motion with respect to roadway features and waypoints. Environmental factors such as visibility and road conditions may also impact CV2X services. A vehicle within a threshold proximity of, and approaching a busy intersection, may be elevated in priority for listening to and participating in CV2X group-cast, broadcast or unicast messaging for managing vehicle behavior at the intersection. A vehicle departing (i.e., moving away from an intersection) may deprioritize, or even deactivate services specific to that intersection.

Figure 1:
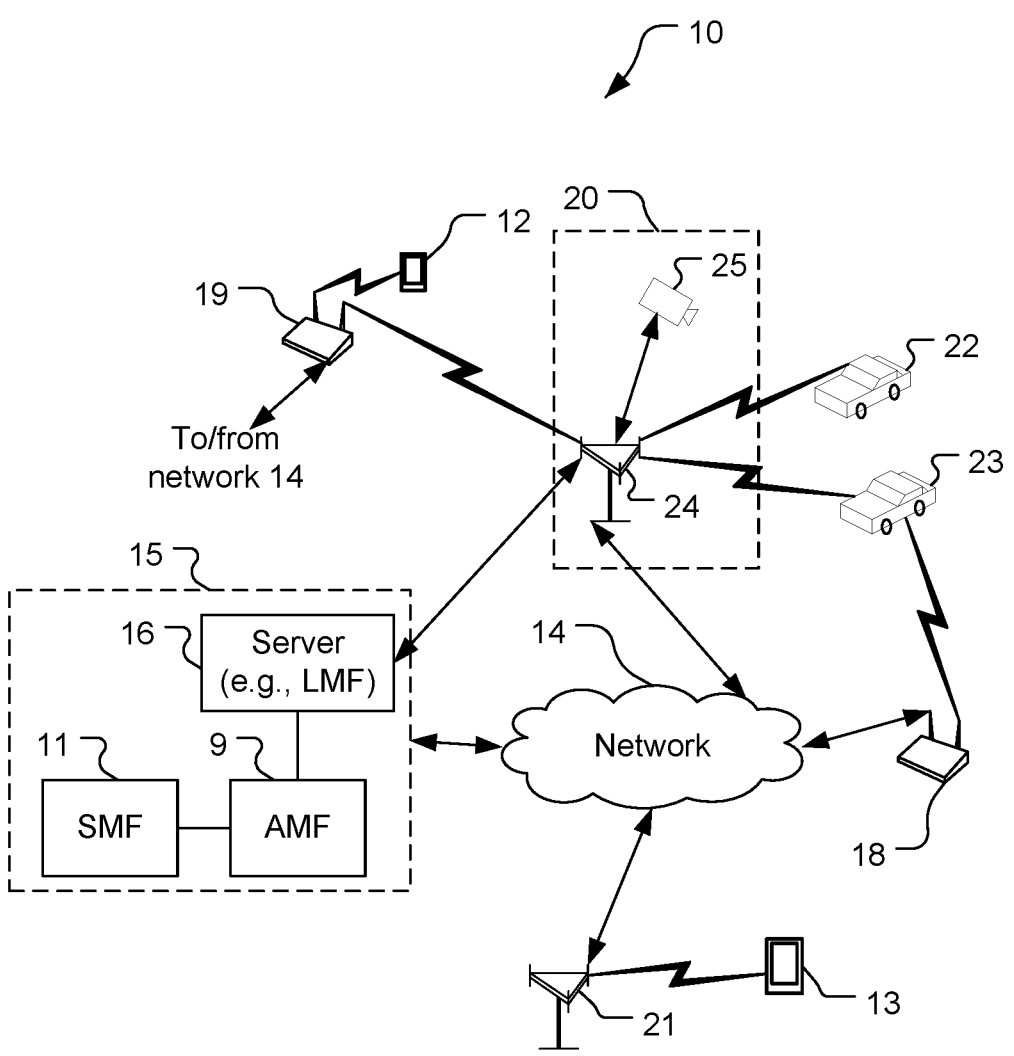
FIG. 1 is a schematic diagram of a connected-vehicle communication system.

Referring to FIG. 1, an example connected-vehicle communication system 10 includes UEs 12, 13, 22, 23, a network 14, a core network 15, access points (APs) 18, 19, a roadside unit (RSU) 20, and a base transceiver station (BTS) 21. The core network 15 (e.g., a 5G core network (5GC)) includes back-end devices including, among other things, an Access and Mobility Management Function (AMF) 9, a Session Management Function (SMF) 11, and a server 16 communicatively coupled to the SMF 11 and the AMF 9. The server 16 may be an edge computing device (i.e., server) such as a Location Management Function (LMF) that supports positioning of the UEs 12, 13, 22, 23 (e.g., using techniques such as Assisted GNSS (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The LMF may also be referred to as a Location Manager (LM), a Location Function (LF), a commercial LMF (CLMF), or a value-added LMF (VLMF). The server 16 (e.g., an LMF), and/or the network, and/or the BTS 21, and/or a BTS 24 (e.g., a gNB) of the RSU 20, and/or the UE 12, 13, 22, 23 may be configured to determine location of the UE 12, 13, 22, 23. The server 16 may communicate directly with the BTS 24 (e.g., a gBNB), may be co-located with the BTS 24, and may be integrated with the BTS 24. The SMF 11 may serve as an initial contact point of a Service Control Function (SCF) (not shown) to create, control, and delete media sessions. The AMF 9 may serve as a control node that processes signaling between the UEs 12, 13, 22, 23 and the core network 15, and provides QoS (Quality of Service) flow and session management. The AMF 9 may support mobility of the UEs 12, 13, 22, 23 including cell change and handover and may participate in supporting signaling connection to the UEs 12, 13, 22, 23. The RSU 20 may include, as shown, the BTS 24 and one or more sensors, in this example, a camera 25. The RSU 20 may be configured differently, e.g, may be a standard base station (e.g., not including the sensor(s)) such as a gNB, may be integrated into a base station such as a gNB, and/or may be integrated into another object or device (e.g., a light post, a building, a sign, etc.). The RSU 20 may be called roadside equipment (RSE) or other names. The RSU 20 may or may not be disposed in a vicinity (e.g., within wireless communication range) of a road and thus the term "roadside" does not limit a location of the RSU 20. The system 10 is capable of wireless communication in that components of the system 10 can communicate with one another (at least some times using wireless connections) directly or indirectly, e.g., via the network 14 and/or one or more of the access points 18 and the base transceiver station 21 (and/or one or more other devices not shown, such as one or more other RSUs and/or one or more other base transceiver stations). For indirect communications, the communications may be altered during transmission from one entity to another, e.g., to alter header information of data packets, to change format, etc. The UEs 12, 13 shown are mobile wireless communication devices (although they may communicate wirelessly and via wired connections) including mobile phones (including smart-phones) and a tablet computer. The UEs 22, 23 shown are vehicle-based mobile wireless communication devices (al-though they may communicate wirelessly and via wired connections). The UEs 22, 23 are shown as cars, but these are examples and numerous other configurations of the UEs 22, 23 may be used. For example, one or more of the UEs 22, 23 may be configured as a different type of vehicle such as a truck, a bus, a boat, etc. Further, the quantity of the UEs 22, 23 is an example, and other quantities of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 10 and may communicate with each other and/or with the UEs 12, 13, 22, 23, the network 14, the server 16, the APs 18, 19, the RSU 20, and/or the BTS 21. For example, such other devices may include internet of thing (IoT) devices, medical devices, home entertainment and/or automation devices, etc.

The UEs 12, 13, 22, 23 or other devices may be config-ured to communicate in various networks and/or for various purposes and/or using various technologies (e.g., 5G, Wi-Fi communication, multiple frequencies of Wi-Fi communication, satellite positioning, one or more types of communi-cations (e.g., GSM (Global System for Mobiles), CDMA (Code Division Multiple Access), LTE (Long-Term Evolu-tion), V2X (e.g., V2P (Vehicle-to-Pedestrian), V2I (Vehicle-to-Infrastructure), V2V (Vehicle-to-Vehicle), etc.), IEEE 802.11p, etc.). CV2X communications may utilize a cellular network via the Uu interface and/or WiFi or other short range connection via the PC5 interface). The system 10 may support operation on multiple carriers (waveform signals of different frequencies). Multi-carrier transmitters can trans-mit modulated signals simultaneously on the multiple car-riers. Each modulated signal may be a Code Division Multiple Access (CDMA) signal, a Time Division Multiple Access (TDMA) signal, an Orthogonal Frequency Division Multiple Access (OFDMA) signal, a Single-Carrier Fre-quency Division Multiple Access (SC-FDMA) signal, etc. Each modulated signal may be sent on a different carrier and may carry pilot, overhead information, data, etc.

The BTSs 21, 24 may wirelessly communicate with the UEs 12, 13, 22, 23 in the system 10 via one or more antennas. A BTS may also be referred to as a base station, an access point, a gNode B (gNB), an access node (AN), a Node B, an evolved Node B (eNB), etc. For example, the BTS 24 may be a gNB or a transmission point gNB. The BTSs 21, 24 may be configured to communicate with the UEs 12, 13, 22, 23 via multiple carriers. The BTSs 21, 24 may provide communication coverage for a respective geo-graphic region, e.g. a cell. Each cell may be partitioned into multiple sectors as a function of the base station antennas.

The system 10 may include macro BTSs or the system 10 may have BTSs of different types, e.g., macro, pico, and/or femto base stations, etc. A macro base station may cover a relatively large geographic area (e.g., several kilometers in radius) and may allow unrestricted access by terminals with service subscription. A pico base station may cover a rela-tively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The UEs 12, 13, 22, 23 may be referred to as terminals, access terminals (ATs), mobile stations, mobile devices, subscriber units, etc. The UEs 12, 13, 22, 23 may include various devices as listed above and/or other devices. The UEs 12, 13, 22, 23 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 12, 13, 22, 23 utilizing D2D com-munications may be within a geographic coverage area of a base station such as one or both of the BTSs 21, 24. Other UEs in such a group may be outside such geographic coverage areas, or be otherwise unable to receive transmis-sions from a base station. Groups of the UEs 12, 13, 22, 23 communicating via D2D communications may utilize a one-to-many (1:M) system in which each UE may transmit to other UEs in the group. A base station such as the BTS 21 and/or the BTS 24 may facilitate scheduling of resources for D2D communications. In other cases, D2D communications may be carried out between UEs without the involvement of a base station.

In an embodiment, V2X may operate in an infrastructure-less fashion using sidelink communications. In this mode, UEs may broadcast, groupcast or unicast to other UEs. The UEs may utilize existing standards such as 5G NR V2X, dedicated short-range communications (DSRC), or other wireless communications protocols. The connected-vehicle communication system 10 is described as an example, and not a limitation, as the disclosure provided herein may be configured for other networks and is not constrained to traditional cellular systems.

Figure 2:
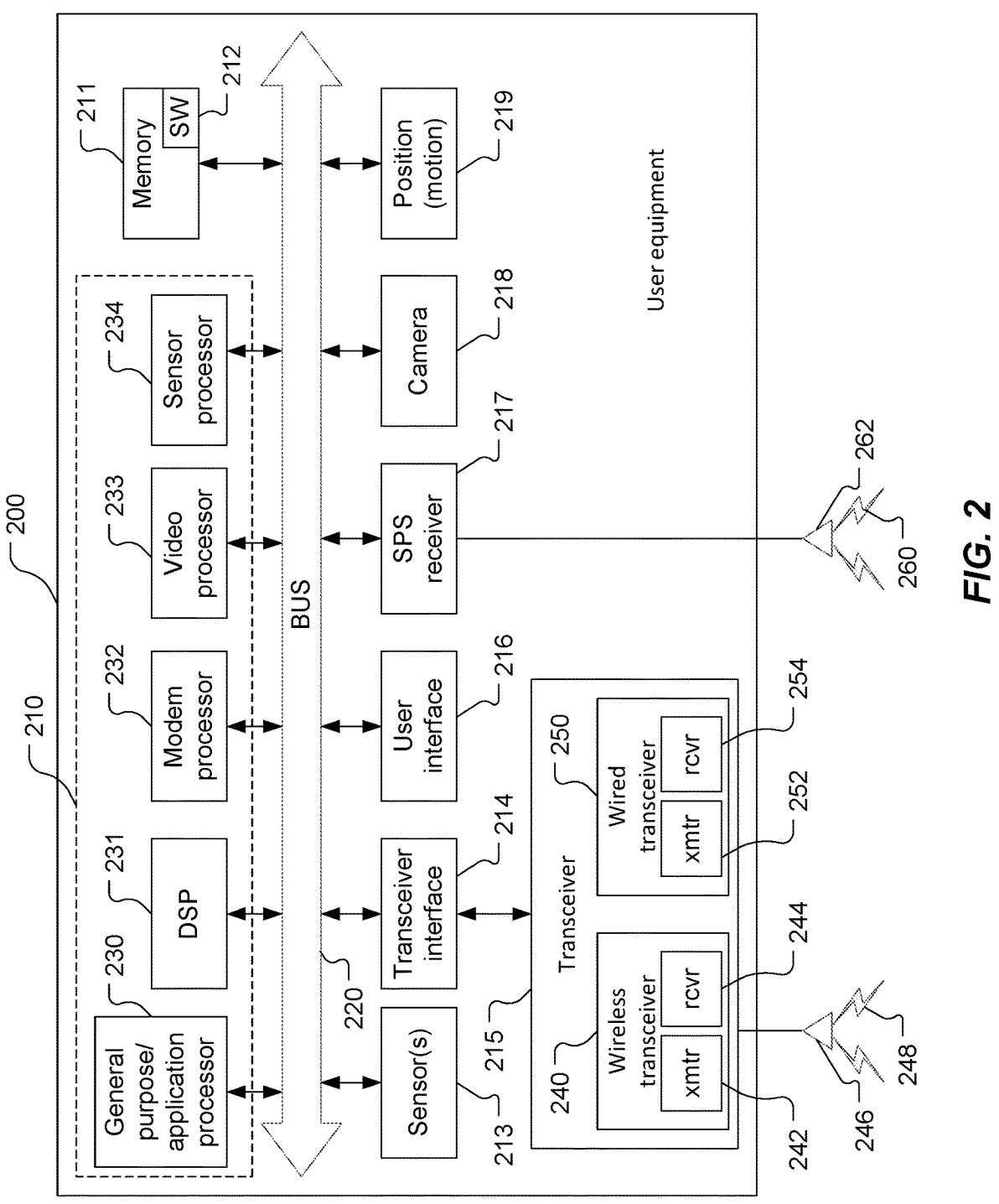
FIG. 2 is a block diagram of components of an example of a user equipment shown in FIG. 1.

Referring also to FIG. 2, a UE 200 is an example of one of the UEs 12, 13, 22, 23 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM)), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more inertial sensors and/or one or more environment sensors. The inertial sensor(s) may comprise, for example, one or more accelerometers (e.g., collectively responding to acceleration of the UE 200 in three dimensions), one or more gyroscopes, and/or one or more magnetometers (e.g., to support one or more compass applications). The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DPS 231 and/or the processor 230 in support of one or more applications such as, for example, applications directed to positioning and/or navigation operations.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The antenna(s) 246 is(are) part of the UE 200 even though the antenna(s) 246 is(are) shown outside of the box of the UE 200. The wireless transceiver 240 may be configured to communicate signals (e.g., with the RSU 20 and/or one or more other RSUs, and/or one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 14 to send communications to, and receive communications from, the server 16, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The antenna 262 is part of the UE 200 even though the antenna 262 is shown outside of the box of the UE 200. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 210, the memory 211, the DSP 231 and/or one or more specialized processors (not shown) may be utilized to process acquired SPS signals, in whole or in part, and/or to calculate an estimated location of the UE 200, in conjunction with the SPS 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217UE 200. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscopes, accelerometers, etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
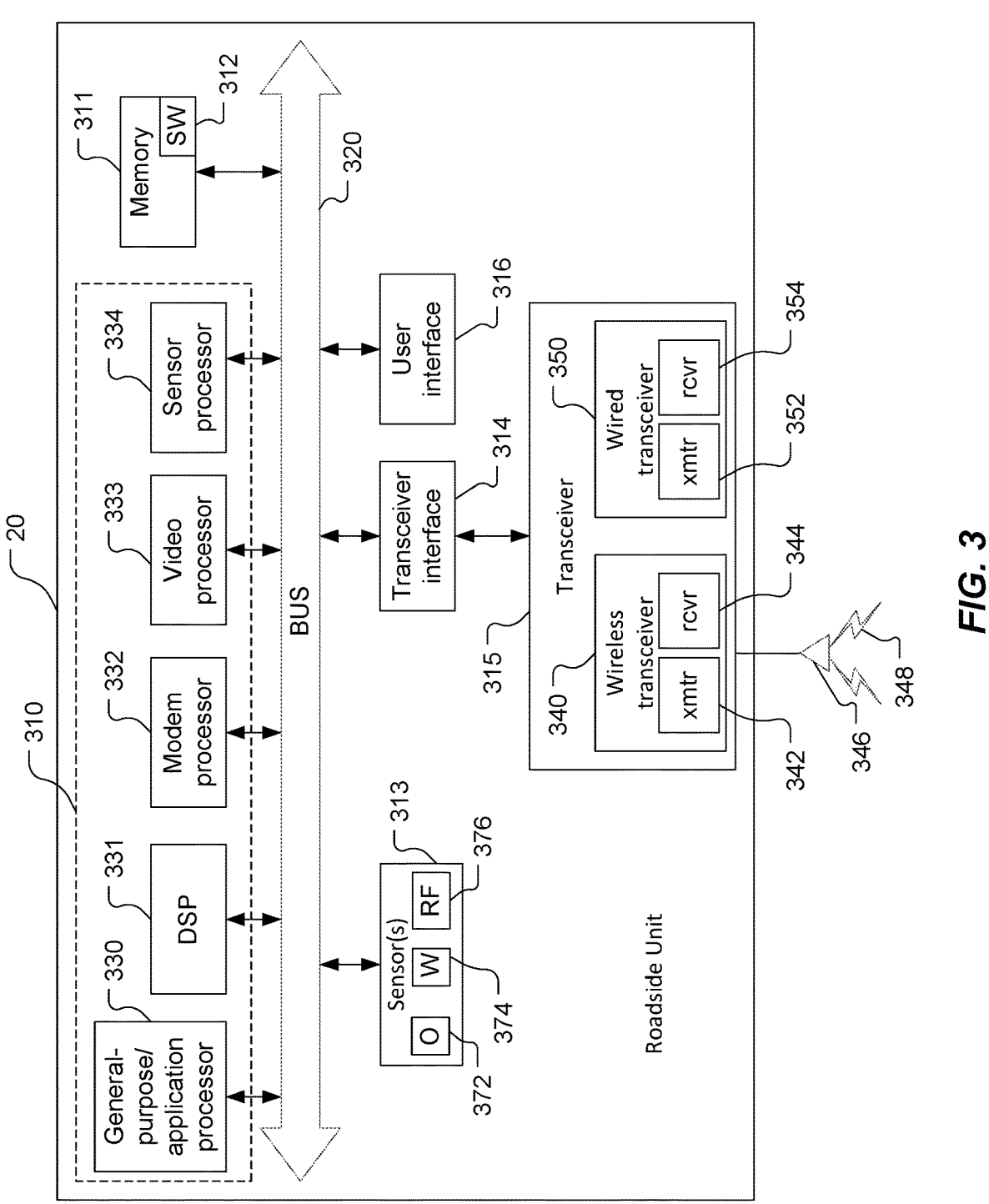
FIG. 3 is a block diagram of components of an example roadside unit shown in FIG. 1.

Referring also to FIG. 3, an example of the RSU 20 comprises a computing platform including a processor 310, memory 311 including software (SW) 312, one or more sensors 313, a transceiver interface 314 for a transceiver 315, and a user interface 316. The processor 310, the memory 311, the sensor(s) 313, the transceiver interface 314, and the user interface 316 may be communicatively coupled to each other by a bus 320 (which may be configured, e.g., for optical and/or electrical communication). At least portions of the processor 310, the memory 311, the transceiver interface 314, and the transceiver 315 comprise the RSU base station 24. One or more of the shown apparatus (e.g., the user interface 316) may be omitted from the RSU 20. The processor 310 may include one or more intelligent hardware devices, e.g., a central processing unit (CPU), a microcontroller, an application specific integrated circuit (ASIC), etc. The processor 310 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors 330-334 performing the function. The description may refer to the RSU 20 performing a function as shorthand for one or more appropriate components of the RSU 20 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The antenna(s) 346 is(are) part of the RSU 20 even though the antenna(s) 346 is(are) shown outside of the box of the RSU 20. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 14 to send communications to, and receive communications from, the server 16, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

Figure 5:
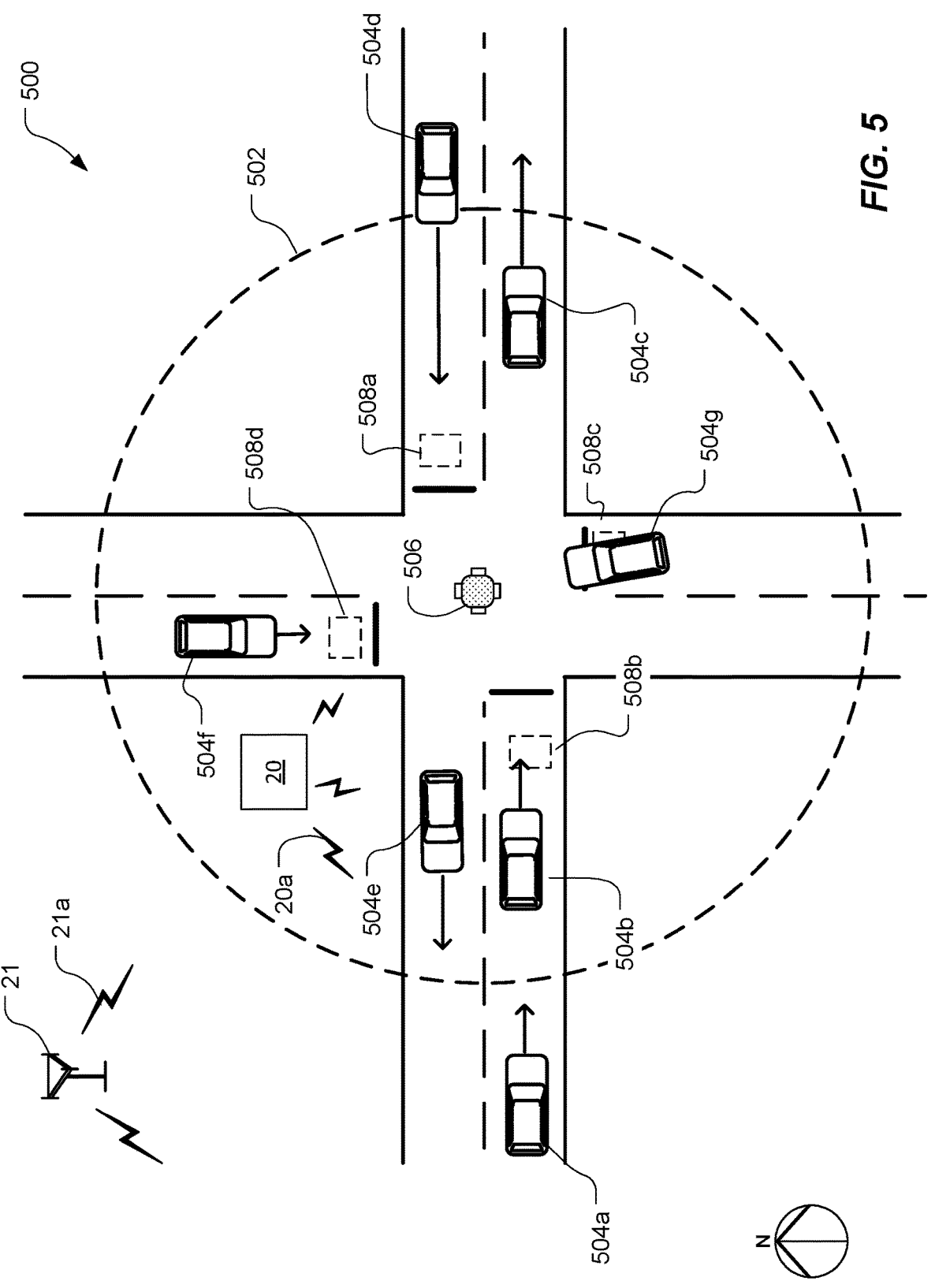
FIG. 5 is a top view of an intersection with a roadside unit configured for situationally-dependent service prioritization.

The sensor(s) 313 may include an optical sensor 372, a weight sensor 374, an RF sensor 376, and optionally one or more other sensors not shown. While one optical sensor 372, one weight sensor 374, and one RF sensor 376 are shown in FIG. 3, and referred to herein in the singular, the optical sensor 372 may include more than one optical sensor, the weight sensor 374 may include more than one weight sensor (e.g., as shown in FIG. 5 and discussed below), and/or the RF sensor 376 may include more than one RF sensor. The optical sensor 372 may be configured to capture one or more images. For example, the optical sensor 372 may include one or more cameras such as the camera 25. The weight sensor 374 may be configured to detect the presence and/or determine the weights of objects such as the UEs 22, 23, and may be configured as one weight sensor or multiple separate weight sensors. The sensors 372, 374 are examples and not limiting of the description as numerous other types and/or quantities of sensors may be used. The RF sensor 376 may be configured to sense RF traffic associated with the geographic region.

The optical sensor 372 may include one or more cameras for capturing still or moving imagery. The camera(s) may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 316.

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the RSU 20. For example, the user interface 316 may store indications of analog and/or digital signals in the memory 311 to be processed by DSP 331 and/or the general-purpose processor 330 in response to action from a user. Similarly, applications hosted on the RSU 20 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 316 may comprise one or more touch sensors responsive to touching and/or pressure, e.g., on a keyboard and/or touch screen of the user interface 316.

Figure 4:
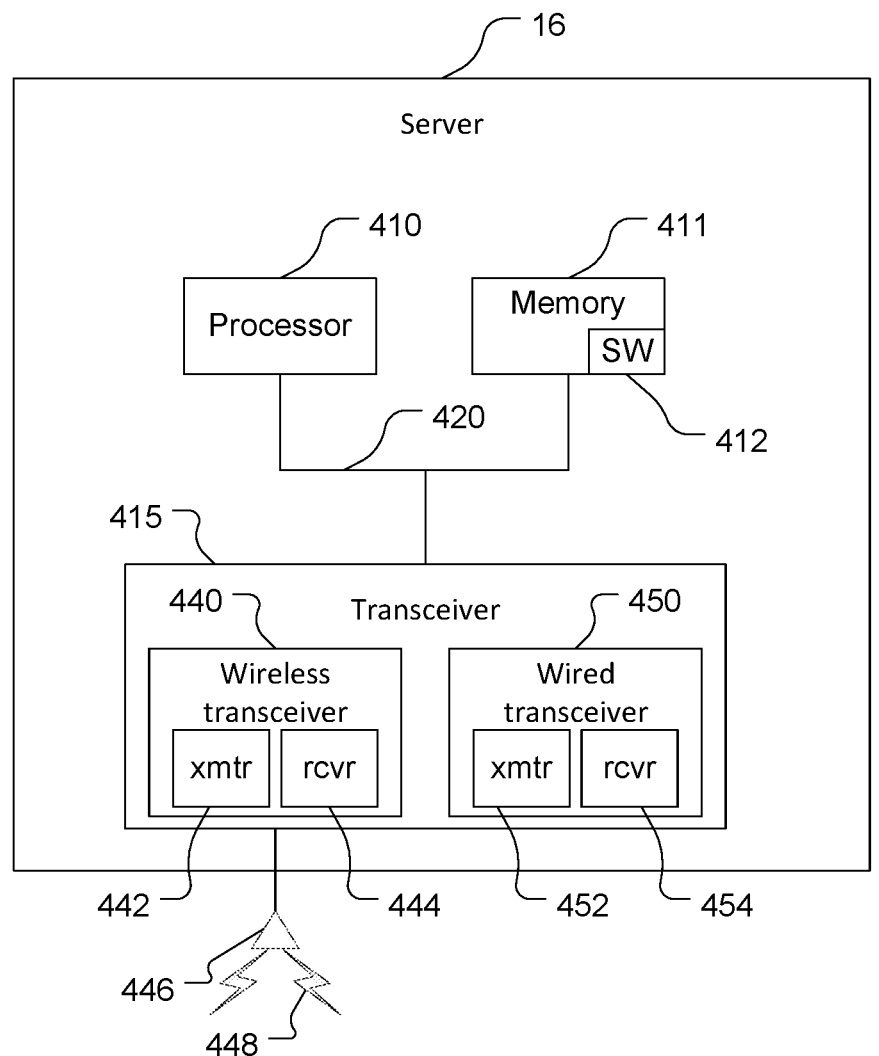
FIG. 4 is a block diagram of components of an example edge server.

Referring also to FIG. 4, an example of the server 16 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 16. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 16 performing a function as shorthand for one or more appropriate components of the server 16 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The antenna(s) 446 is(are) part of the server 16 even though the antenna(s) 446 is(are) shown outside of the box of the server 16. The wireless transceiver 440 may be configured to communicate signals (e.g., with the UE 200, one or more other UEs, the RSU 20, one or more other RSEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 14 to send communications to, and receive communications from, the RSU 20 and/or a web server, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

Referring to FIG. 5, with further reference to FIGS. 1-4, a top view of an intersection 500 with a RSU 20 configured for situationally-dependent service prioritization is shown. The intersection 500 may optionally include a traffic light 506 or other traffic control or operator notification device. In an example, one or more cameras 25 may be disposed to survey the approaches to the intersection 500 and detect approaching vehicles. The intersection 500 may also optionally include one or more weight or pressure sensors 508a-d to detect the presence of vehicles at different approaches to the intersection 500. The intersection 500 is an example waypoint and not a limitation. The intersection 500 may be, for example, a static location defined in a location based services database, such as an area of interest or waypoint defined in map data of a navigation application. Other types of waypoints may be used. For example, the situationally-dependent service prioritization techniques provided herein may be used in any area where the risk of collision or other vehicle related accidents may occur such as highway on/off ramps, toll booths, parking lots, rotaries (e.g., round-abouts), lane transition areas (e.g., lane ending), busy pedestrian crossings (e.g., stadiums), railroad crossings, construction areas, and areas proximate to emergency vehicles such as a roadside accident scene. The waypoints may be dynamically defined locations, such as an area proximate to an emergency vehicle during a high speed transit, the area around a school bus as it travels along a route, or an area occupied by a cluster of vehicles moving in an impromptu traffic jam (e.g., vehicles stuck behind a slow moving wide load or snow plow). An edge computing resource, such as the server 16, may be configured to analyze traffic patterns to identify static and dynamic waypoints based on traffic density and/or other factors corresponding to increased risks of vehicle accidents. The server 16 may be configured to instruct the RSU 20 and/or UEs 12, 13, 22, 23 to implement situationally-dependent service prioritization techniques based on the identified waypoints. In an embodiment, a UE invocation/activation of CV2X services may include UE autonomous actions and other network signaling.

A waypoint (i.e., the intersection 500) includes a threshold region 502. While the threshold region 502 is shown as a two-dimensional circle in FIG. 5, a threshold region 502 may be one-dimensional, three-dimensional, four-dimensional, etc. An example of a three-dimensional threshold region may include a multilevel parking garage, and an example of a four-dimensional may be a three-dimensional geometry that varies over time (e.g., being schedule-based (varying according to a schedule) or adaptive (varying dynamically)). The threshold region 502 may be relative to a point or line in space (i.e., vector based), defined by multiple vertices (e.g., a polygon), etc. The threshold region 502 may not be contiguous. The threshold region 502 may include one or more sub-threshold regions defining a subset within the threshold region.

A plurality of vehicles 504a-g are travelling through the intersection 500. The vehicles 504a-g are example UEs 200, such as the UEs 12, 13, 22, 23, and the RSU 20 and the BTS 21 are configured to communicate with the vehicles 504a-g via a respective CV2X mode such as a PC5 link 20a and a Uu link 21a. The CV2X service data may be provided across different modes of communication, i.e., broadcast, groupcast, and unicast. The vehicles 504a-g may receive map data from the communication system 10 (e.g., from the BTS 21 or the RSU 20), or may have the map data previously stored in local memory 211. The map data may include the location of waypoints and the corresponding threshold regions associated with the waypoints. The vehicles 504a-g may be configured to determine a current location as well as speed and direction based on local devices such as the SPS receiver 217, wireless transceiver 240, and other inertial or external sensors (e.g., camera 218 for image based positioning). In an example, a server 16 in the communication system 10 may be configured to determine the locations, speeds, and directions of the vehicles 504a-g based on signals obtained by the vehicles 504a-g, and then utilize those locations for the techniques provided herein.

In operation, the CV2X services provided by the communication system 10, including the RSU 20 and the BTS 21, may have different priorities. The priority assignment may be associated with the data packets being transmitted over the respective data links 20a, 21a (e.g., PC5, Uu). For example, an application layer of CV2X software executing on a UE, RSU or edge server may set the priority level for a data packet. In an LTE based system, the priority level may be based on the proximity-based service (ProSe) Per-Packet Priority (PPPP) value assigned to each packet in the lower level software architecture. Typically, the PPPP values range from 1 to 8, with 1 being the highest priority (i.e., lowest value having higher priority), and 6 being the default priority for many applications. The priority level for NR PC5 may have the same format and meaning as the priority value of the PPPP for LTE PC5 defined in 3GPP TS 23.285. In the case of NR PC5, the Packet Delay Budget (PDB) may be derived from a PQI (e.g., 5QI) table as defined in 3GPP TS 23.287, clause 5.4.4 (Rev. 16). In the case of LTE PC5, the PDB derivation is according to 3GPP TS 23.285, i.e. the low PDB is mapped to the high priority PPPP value. Using the same format for priority level and PPPP may provide better backward compatibility. In general, the priority level may be used to differentiate treatment of CV2X service data across different modes of communication, i.e. broadcast, groupcast, and unicast. In case when all Quality of Service (QoS) requirements cannot be fulfilled for all the PC5 service data, the priority level may be used to select for which PC5 service data the QoS requirements are prioritized such that a PC5 service data with priority level value N is prioritized over PC5 service data with higher Priority Level values, i.e. N+1, N+2, etc. (i.e., lower number meaning higher priority). In an embodiment, a UE may independently set the CV2X service priority based on evaluation of local conditions (e.g., independent of whether or not the packets received over-the-air have a priority or not).

The priority assignments may be based on the location and motion of the vehicles 504a-g relative to the threshold region 502. The current states (i.e., location, speed, direction, planned route) of the vehicles 504a-g may be determined by vehicles (i.e., local processing) or by one or more network resources (i.e., remote processing). A current state for a vehicle may be compared to the threshold region to determine the priority of the data packets exchanged between the communication system 10 and the vehicle. For example, referring to FIG. 6, the threshold region may be defined by one or more fields in a data structure such as a look-up table 600. The look-up table 600 is an example and not a limitation as other data structures such as relational databases and other flat files (e.g., XML, JSON) may be used to define a threshold region. The look-up table 600 may be included with map data and associated with a waypoint. For example, the vehicles 504a-g may receive map data, including the look-up table 600, from the BTS 21 via a Uu link. The look-up table 600 includes parameters associated with the threshold region 502. For example, a first field 602 is based on a distance from center of the intersection 500. A second field 604 is based on an Estimated Time of Arrival (ETA) in seconds for a vehicle to arrive at the center of the intersection 500 based on the vehicle's current location, speed and heading. A third field 606 indicates the priority level to assign to the PPPP/PQI based on the conditions in the first and second fields 602, 604. The distance, ETA and priority values are examples. Other fields and other values may be used to define an increase or decrease in priority value based on a current state of a vehicle (e.g., relative distance, speed, heading) and a threshold region. In an example, environmental factors such as visibility (e.g., fog, snow, darkness, etc.) and road conditions (e.g., icy, wet leaves, black ice, etc.) may be used to increase the priority value.

In an example, the threshold region 502 may have a radius of 1000 m (i.e., 1 km) from the waypoint (i.e., the center of the intersection 500). A first vehicle 504a is approaching the intersection from the west and is outside of the threshold region 502. The state of the first vehicle 504a is that it is greater than 1000 m from the center of the intersection 500 or it has an ETA to the center of the intersection 500 that is greater than 10 mins. The first vehicle 504a may be in communication with the RSU 20 but will exchange data packets at the default priority (i.e., 6) based on the criteria of the look up table 600. In an example, the vehicles 504a-g may be configured to modify the priority values of the data packets exchanged with the communication system 10 locally (i.e., utilizing software 212 and processor 230 in the UE 200). In another example, a network resource such as the RSU 20 or the server 16 may be configured to change the priority values of the data packets exchanged with the vehicles 504a-g. In general, the majority of CV2X services relate to communications between the RSU 20 and the vehicles 504a-g via the PC5 link 20a, but CV2X services may also utilize the Uu link between the BTS 21 and the vehicles 504a-g. The priority values in the data packets exchanged via the Uu link 21a may also be raised and lowered as described herein.

A second vehicle 504b is proceeding east towards the center of the intersection 500 and is within the threshold region 502. The state of the second vehicle 504b further includes a speed of approximately 40 mph with an ETA at the center of the intersection 500 in approximately 55 seconds. The processor 230 in the second vehicle 502b, or the processor 330 in the RSU 20, are configured to determine the priority value based on previously stored data, such as the look-up table 600. In an example, the priority value may be based on a function such that the vehicles closer (or soon to be closer) to the center of the intersection will be given higher data packet exchange priority (i.e., a lower priority value). In this example, the second vehicle 504b is assigned a priority value of 3 (i.e., distance is >1000 m and ETA<65 seconds but>50 seconds). The application layer of the CV2X software executing on the second vehicle 504b or RSU is configured to assign the PPPP or PQI (5QI) value to 3. In an example, the processor 410 in an edge server operably coupled to the BTS 21 may be configured to set the priority value using the process described.

A third vehicle 504c has crossed the intersection 500 and is heading east away from the intersection 500. In this example, the third vehicle 504c is within the threshold region 502 but the vehicle state includes a location that is past the intersection and a direction that is heading away from the intersection. Thus, the ETA to the center of the intersection is Not Applicable (e.g., infinite). The priority level value of the third vehicle 504c was decreased as it approached the center of the intersection 500 (e.g., as described for the second vehicle 504b), and then the priority value increases as the third vehicle passes the center of the intersection as the relative risk of an accident decreases. For example, as indicated in the look-up table 600, the PPPP/PQI priority value may be set to 4 for a vehicle that is within the threshold region 502 but heading away from the waypoint (i.e., ETA is N/A).

A fourth vehicle 504d is heading west towards the waypoint at a high speed. The state of the fourth vehicle 504d may include a location that is entering, or within, the threshold region 502 and at a speed of 75 mph with an ETA to the waypoint (i.e., the center of the intersection 500) of approximately 30 seconds. The priority level in the look-up table 600 based on these parameters is a 1 (i.e., the data packets with the PPPP/PQI value of 1 have the highest priority). In an example, the RSU 20 may detect the high speed of the fourth vehicle 504d and utilize that information to increase the priority values of the data packets associated with other vehicles that are proximate to the waypoint. For example, the priority values associated with a fifth vehicle 504e may be decreased (i.e., assigned a higher message priority) because the fifth vehicle is in the path of the speeding fourth vehicle 504d. Similarly, a sixth vehicle 504f may be slowly approaching the intersection 500 from the north at approximately 25 mph with an ETA of 100 seconds (i.e., priority value 4 from the look-up table 600). The presence of the speeding fourth vehicle 504d may cause the RSU 20 (or an edge server 16) to decrease the priority value of the sixth vehicle 504f to a value of 3, 2, or 1 because of the increased risk caused by the speeding fourth vehicle 504d.

A seventh vehicle 504g may be stopped while heading north and attempting the make a left-had turn to the west through the intersection 500. The seventh vehicle 504g may have a state of being stationary (e.g., speed less than 1 mph) and a location of less than 50 meters to the waypoint. The 50 meter range to the waypoint is an example of a sub-threshold region within the threshold region 502. In this example, the small or zero speed vector may obviate the relevance of the ETA parameter in the look-up table 600. Thus, the proximity parameter alone (i.e., within 50 m of the waypoint) is sufficient to determine a priority value of 1.

Figure 6:
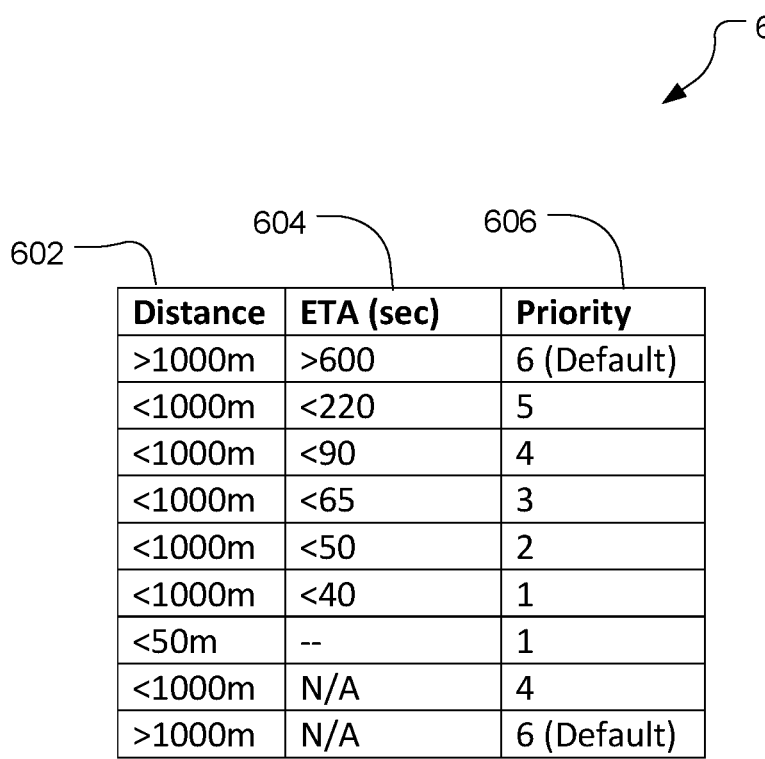
FIG. 6 is an example look-up table for data packet priority values for use with situationally-dependent service prioritization algorithms.

The scenarios and priority level values described in FIGS. 5 and 6 are examples. Other scenarios and corresponding priority levels may be generated based on other geographic and operational considerations. In general, situationally-depending service prioritization includes assigning lower priority values (i.e., data packets with higher processing priority) to more time dependent use cases where there is a higher potential for an accident and/or personal injury. The computations described herein for vehicle state (e.g., vehicle location, speed, heading), as well as the determination of the priority level may be performed locally by processors in the vehicles or remotely by network resources (e.g., RSU 20, server 16). The situationally-dependent service prioritization thus described may be associated with geographic waypoints (e.g., intersections, on/off ramps, accident scenes, etc.) as well as dynamic waypoints (e.g., emergency vehicle, school bus, utility vehicle, traffic cluster, etc.). Service prioritization may also be based on environmental factors and road conditions (e.g., snow, rain, black ice, fog, darkness, stalled vehicles, road hazards, etc.). In an example, a geographic or dynamic waypoint may be proximate to, or be equipped with, an RSU 20 that is configured to implement situationally-dependent service prioritization.

Figure 7:
FIG. 7 is a block flow diagram of a method for prioritizing data packets with a mobile device
Figure 7:
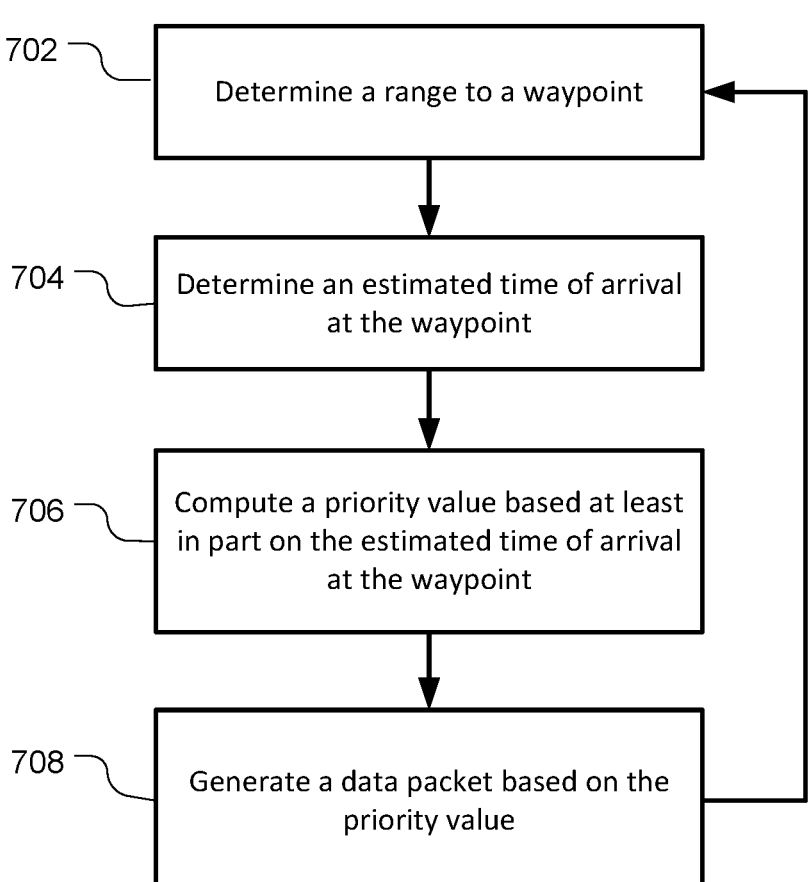

Referring to FIG. 7, with further reference to FIGS. 1-6, a method 700 for prioritizing data packets with a mobile device includes the stages shown. The method 700 is, however, an example and not limiting. The method 700 may be altered, e.g., by having stages added, removed, rearranged, combined, performed concurrently, and/or having single stages split into multiple stages. For example, stages 702 and 704 for determining range and ETA to a waypoint may be completed simultaneously. Still other alterations to the method 700 as shown and described are possible.

At stage 702, the method includes determining a range to a waypoint. The UE 200, including the processor 230, the wireless transceiver 240, and SPS receiver 217, is an example of means for determining a range to a waypoint. A vehicle, such as the first vehicle 504a, may include a UE 200 configured for navigation applications. The UE 200 may include map data in memory 211, or may receive map data from the communication network 10. The map data may include waypoint information based on a geographic location, such as the intersection 500. The map data may include one or more threshold regions associated with the waypoint. In an example, the waypoint information may be provided independently based on dynamic events. For example, a waypoint may be the location of an accident, construction area, or other temporary location. A waypoint may be based on a moving object such as an emergency vehicle or a traffic cluster as identified by a networked server, such as the server 16. The location of the waypoint may be provided to the UE 200, and the UE 200 may utilize positioning information to determine the range to waypoint. The positioning information may be based on satellite signals (e.g., GNSS) or terrestrial methods (e.g., RTT, OTDOA, AOA, E-CID, etc.).

At stage 704, the method includes determining an estimated time of arrival (ETA) at the waypoint. The processor 230 in the UE 200 is a means for determining the ETA. In an example, the UE 200 may include a navigation application configured for route planning and may be configured to determine an ETA to a waypoint based on the current location of the UE 200. Additional sensor information (e.g., speed, heading) may be used to determine the ETA to the waypoint.

At stage 706, the method includes computing a priority value based at least in part on the estimated time of arrival at the waypoint. The processor 230 in the UE 200 is a means for computing a priority value. In an example, the UE 200 may receive a data structure, such as the look-up table 600, with the waypoint information. The data structure may be included in the map data received from the communication network In an example, the data structure may be stored in the memory 211 of the UE 200. The processor 230 may be configured to utilize the range (i.e., based on the current location of the UE 200) determined at stage 702 to determine the location of the UE 200 relative to a threshold region. The range and/or threshold information, and the ETA value may be used to select a priority value in the data structure. For example, the data structure may include priority values associated with CV2X PPPP or PQI values associated with distance and ETA values, such as depicted in FIG. 6. Other data structures or functions may be used to generate priority values based on the ETA at the waypoint. In an example, the ETA to a waypoint may be infinite (e.g., when the UE 200 is stationary) and a priority value may be based solely on the range of the UE 200 to the waypoint. In an example, the priority value may be based, at least in part, on environmental and/or road conditions. For example, icy roads, fog, rain, snow, darkness, etc. may increase the priority value based on the increased likelihood of collision associated with such conditions. The sensors 213 may include visibility, temperature, barometric pressure, moisture sensors, etc. configured to detect environmental conditions. The UE 200 may also be configured to receive environmental and/or road conditions from external sources such as an in-vehicle safety and security systems, and other roadside assistance systems. In an example, the UE 200 may receive road condition information via V2X messaging (e.g., indications of road hazards, construction, stalled vehicle, etc.).

At stage 708, the method includes generating a data packet based on the priority value. The processor 230 in the UE 200 is a means for generating a data packet. The priority value is based on the priority assignments associated with the data packets being transmitted over CV2X data links 20a, 21a (e.g., PC5, Uu). In an example, an application layer of CV2X software executing on the UE 200 may set the priority level for a data packet. In an LTE based system, the priority level may be based on the PPPP value assigned to each packet in the lower level software architecture. The priority level for NR PC5 may have the same format and meaning as the priority value of the PPPP for LTE PC5 defined in 3GPP TS 23.285. In the case of NR PC5, the PDB may derived from a PQI (e.g., 5QI) table as defined in 3GPP TS 23.287, clause 5.4.4 (Rev. 16). In the case of LTE PC5, the PDB derivation is according to 3GPP TS 23.285, i.e. the low PDB is mapped to the high priority PPPP value. The priority level may be used to differentiate treatment of CV2X data packets across different modes of communication, i.e. broadcast, groupcast, and unicast. The method 700 may periodically iterate (e.g., 10, 100, 200, 500 msec) back to stage 702 to update the range and ETA to the waypoint and compute a new priority value.

Figure 8:
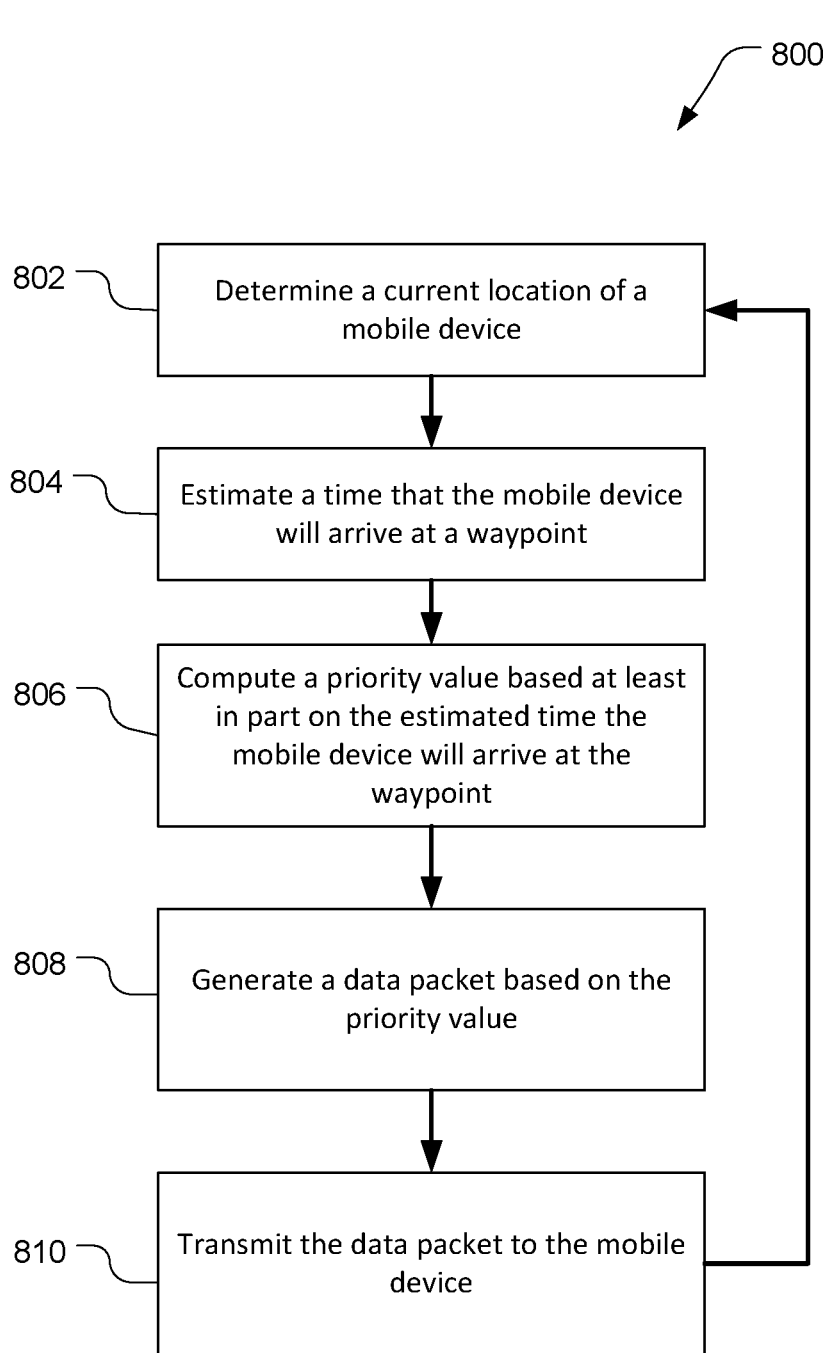
FIG. 8 is a block flow diagram of a method for prioritizing data packets with a roadside unit or an edge server.

Referring to FIG. 8, with further reference to FIGS. 1-7, a method 800 for prioritizing data packets with a roadside unit 20 or an edge server 16 includes the stages shown. The method 800 is, however, an example and not limiting. The method 800 may be altered, e.g., by having stages added, removed, rearranged, combined, performed concurrently, and/or having single stages split into multiple stages. For example, stages 802 and 804 for determining location of a mobile device and ETA to a waypoint may be completed simultaneously. Still other alterations to the method 800 as shown and described are possible.

At stage 802, the method includes determining a current location of a mobile device. The RSU 20, including the processor 330 and the wireless transceiver 340, or the edge server 16 including the processor 410 and the wireless transceiver 440, are examples of means for determining a current location of a mobile device. The UE 200 is an example of a mobile device. In an example, a vehicle may include a UE 200 configured for navigation applications. The UE 200 may provide navigation measurement information to the communication network 10. For example, the UE 200 may provide GNSS signal information to the server 16 and the server may be configured to determine the location of the UE 200. The UE 200 may be configured to compute its location locally and provide the position information to the server 16 or the RSU 20. The server 16 may provide the mobile device location information to the RSU 20. The server 16 may be configured to utilize terrestrial navigation information (e.g., RTT, OTDOA, AOA, E-CID, etc.) received from the UE 200 to determine the current location.

At stage 804, the method includes estimating a time when the mobile device will arrive at a waypoint. The RSU 20 processor 330 and the processor 410 in the server 16 are examples of means for estimating a time of arrival. In an example, server 16 or the RSU 20 may include map data in memory 411, 311, or may receive map data from resources outside of communication network 10. The map data may include waypoint information based on a geographic location, such as the intersection 500. The map data may include one or more threshold regions associated with the waypoint. In an example, the waypoint information may be provided independently based on dynamic events. For example, a waypoint may be the location of an accident, construction area, or other temporary location received from another networked server. A waypoint may be based on a moving object such as an emergency vehicle or a traffic cluster as identified by the RSU 20, the server 16, or other networked servers. The ETA may be based on the relative motions of the waypoint and the mobile device. The ETA represents a relative time when the UE 200 will arrive at the waypoint or one or more threshold regions associated with the waypoint.

At stage 806, the method includes computing a priority value based at least in part on the estimated time the mobile device will arrive at the waypoint. The processor 330 in the RSU 20 or the processor 410 in server 16 are examples of means for computing a priority value. In an example, the RSU 20 and/or the server 16 may receive a data structure, such as the look-up table 600, with the waypoint information from the communication network 10. The data structure may be included in the map data received from the communication network 10. The RSU 20 and/or the server 16 may be configured to utilize the current location of the UE 200 determined at stage 802 to determine the location of the UE 200 relative to a threshold region. The range and/or threshold information, and the ETA value may be used to select a priority value in the data structure. For example, the data structure may include priority values associated with CV2X PPPP or PQI values associated with distance and ETA values, such as depicted in FIG. 6. Other data structures or functions may be used to generate priority values based on the ETA at the waypoint. In an example, the ETA to a waypoint may be infinite (e.g., when the UE 200 is stationary) and a priority value may be based solely on the range of the UE 200 to the waypoint.

At stage 808, the method includes generating a data packet based on the priority value. The RSU 20 processor 330 and the server 16 processor 410 are examples of means for generating a data packet. The priority value is based on the priority assignments associated with the data packets being transmitted over CV2X data links 20a, 21a (e.g., PC5 from the RSU 20, and Uu from the BST 21). In an example, an application layer of CV2X software executing on the RSU 20 or the server 16 may set the priority level for a data packet as previously described. The priority level may be used to differentiate treatment of CV2X data packets across different modes of communication, i.e. broadcast, groupcast, and unicast.

At stage 810, the method includes transmitting the data packet to the mobile device. The wireless transceiver 340 in the RSU 20 and the BST 21 are example means for transmitting the data packet. The RSU 20 may utilize the CV2X PC5 interface to provide the data packet to the UE 200, and the server 16 may utilize the communication network 10, including the BST 21 to provide the data packet to the UE 200 via the CV2X Uu interface. Upon receipt a data packet with a new priority level, the UE 200 may be configured to modify subsequent data packets generated by the UE 200 based on the new priority level determined by the RSU 20 or the server 16. The method 800 may periodically iterate (e.g., 10, 100, 200, 500 msec) back to stage 802 to update the location of the mobile device and ETA to the waypoint and compute new priority values.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the RSU 20 may be performed outside of the RSU 20 such as by the server 16 and/or another RSU.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of prioritizing data packets with a mobile device, comprising:
   determining a range to a waypoint;
   determining an estimated time of arrival at the waypoint;
   computing a priority value based at least in part on the estimated time of arrival at the waypoint; and
   generating a data packet based on the priority value.
2. The method of clause 1 wherein the waypoint is included in map data received by the mobile device.
3. The method of clause 1 wherein computing the priority value includes obtaining the priority value from a look-up table based on the estimated time of arrival and the range to the waypoint.
4. The method of clause 1 further comprising determining an environmental condition wherein the priority value is based at least in part on the environmental condition.
5. The method of clause 1 further comprising determining a road condition wherein the priority value is based at least in part on the road condition.
6. The method of clause 1 wherein the data packet is associated with a long-term evolution communication interface and generating the data packet includes setting a ProSe Per-Packet Priority value based on the priority value.
7. The method of clause 1 wherein the data packet is associated with a 5G new radio communication interface and generating the data packet includes setting a PQI value based on the priority value.
8. The method of clause 1 wherein the data packet is associated with a dedicated short-rage communication wireless communication channel.
9. The method of clause 1 further comprising transmitting the data packet to a roadside unit associated with the waypoint.
10. The method of clause 1 further comprising transmitting the data packet to a cellular base station.
11. The method of clause 1 wherein the waypoint is a dynamic waypoint.
12. The method of clause 11 wherein the dynamic waypoint is an emergency vehicle.
13. An apparatus, comprising:
    a memory;
    at least one transceiver;
    at least one processor communicatively coupled to the memory and the at least one transceiver, and configured to:
    determine a range to a waypoint;
    determine an estimated time of arrival at the waypoint;
    compute a priority value based at least in part on the estimated time of arrival at the waypoint; and
    generate a data packet based on the priority value.
14. The apparatus of clause 13 wherein the at least one processor is further configured to receive map data, wherein the waypoint is included in the map data.

15. The apparatus of clause 13 wherein the at least one processor is further configured to obtain the priority value from a look-up table based on the estimated time of arrival and the range to the waypoint.

16. The apparatus of clause 13 wherein the at least one processor is further configured to determine an environmental condition wherein the priority value is based at least in part on the environmental condition.

17. The apparatus of clause 13 wherein the at least one processor is further configured to determine a road condition wherein the priority value is based at least in part on the road condition.

18. The apparatus of clause 13 wherein the data packet is associated with a long-term evolution communication interface and the at least on processor is further configured to set a ProSe Per-Packet Priority value based on the priority value.

19. The apparatus of clause 13 wherein the data packet is associated with a 5G new radio communication interface and the at least one processor is further configured to set a PQI value based on the priority value.

20. The apparatus of clause 13 wherein the data packet is associated with a dedicated short-rage communication wireless communication channel.

21. The apparatus of clause 13 wherein the at least one processor is further configured to transmit the data packet to a roadside unit associated with the waypoint.

22. The apparatus of clause 13 wherein the at least one processor is further configured to transmit the data packet to a cellular base station.

23. The apparatus of clause 13 wherein the waypoint is a dynamic waypoint.

24. The apparatus of clause 23 wherein the dynamic waypoint is an emergency vehicle.

25. An apparatus for prioritizing data packets, comprising:
    means for determining a range to a waypoint;
    means for determining an estimated time of arrival at the waypoint;
    means for computing a priority value based at least in part on the estimated time of arrival at the waypoint; and
    means for generating a data packet based on the priority value.

26. The apparatus of clause 25 further comprising means for obtaining the priority value from a look-up table based on the estimated time of arrival and the range to the waypoint.

27. The apparatus of clause 25 further comprising means for determining an environmental condition wherein the priority value is based at least in part on the environmental condition.

28. The method of clause 1 further comprising means for transmitting the data packet to a roadside unit associated with the waypoint or means for transmitting the data packet to a cellular base station.

29. A non-transitory processor-readable storage medium comprising processor-readable instructions configured to cause one or more processors to prioritize data packets, comprising:
    code for determining a range to a waypoint;
    code for determining an estimated time of arrival at the waypoint;
    code for computing a priority value based at least in part on the estimated time of arrival at the waypoint; and
    generating a data packet based on the priority value.

30. The non-transitory processor-readable storage medium of clause 29 further comprising code for setting a ProSe Per-Packet Priority value or a PQI value based on the priority value.

31. A method of prioritizing data packets with a networked server, comprising:
    determining a current location of a mobile device;
    estimating a time the mobile device will arrive at a waypoint;
    computing a priority value based at least in part on the estimated time the mobile device will arrive at the waypoint;
    generating a data packet based on the priority value; and
    transmitting the data packet to the mobile device.

32. The method of clause 31 wherein the waypoint is included in map data received by the networked server.

33. The method of clause 31 wherein computing the priority value includes obtaining the priority value from a look-up table based at least in part on the estimated the mobile device will arrive at the waypoint.

34. The method of clause 33 wherein computing the priority value includes obtaining the priority value from the look-up table based at least in part on a range between the mobile device and the waypoint.

35. The method of clause 31 further comprising determining an environmental condition, wherein computing the priority value is based at least in part on the environmental condition.

36. The method of clause 31 further comprising determining a road condition, wherein computing the priority value is based at least in part on the road condition.

37. The method of clause 31 wherein the data packet is associated with a long-term evolution communication interface and generating the data packet includes setting a ProSe Per-Packet Priority value based on the priority value.

38. The method of clause 31 wherein the data packet is associated with a 5G new radio communication interface and generating the data packet includes setting a PQI value based on the priority value.

39. The method of clause 31 wherein the data packet is associated with a dedicated short-rage communication wireless communication channel.

40. The method of clause 31 wherein the networked server is a roadside unit in a vehicle-to-everything network.

41. The method of clause 31 wherein the waypoint is received from another networked server.

42. The method of clause 31 wherein the waypoint is a dynamic waypoint.

43. The method of clause 42 wherein the dynamic waypoint is an emergency vehicle.

44. An apparatus, comprising:
    a memory;
    at least one transceiver;
    at least one processor communicatively coupled to the memory and the at least one transceiver, and configured to:
    determine a current location of a mobile device;
    estimate a time the mobile device will arrive at a waypoint;
    compute a priority value based at least in part on the estimated time the mobile device will arrive at the waypoint;
    generate a data packet based on the priority value; and
    transmit the data packet to the mobile device.

45. A non-transitory processor-readable storage medium comprising processor-readable instructions configured to prioritize data packets, comprising:
  code for determining a current location of a mobile device;
  code for estimating a time the mobile device will arrive at a waypoint;
  code for computing a priority value based at least in part on the estimated time the mobile device will arrive at the waypoint;
  code for generating a data packet based on the priority value; and
  code for transmitting the data packet to the mobile device.

46. An apparatus for prioritizing data packets, comprising:
  means for determining a current location of a mobile device;
  means for estimating a time the mobile device will arrive at a waypoint;
  means for computing a priority value based at least in part on the estimated time the mobile device will arrive at the waypoint;
  means for generate a data packet based on the priority value; and
  means for transmitting the data packet to the mobile device.

The invention claimed is:

1. A method of prioritizing data packets with a mobile device, comprising:
  determining an estimated time of arrival to a waypoint;
  computing a priority value of data packets for transmission over a cellular vehicle to everything (CV2X) data link based at least in part on the estimated time of arrival at the waypoint, wherein a sooner time of arrival corresponds to a higher priority value; and
  transmitting a data packet over a CV2X data link based at least in part on the priority value.

2. The method of claim 1 wherein the waypoint is included in map data received by the mobile device.

3. The method of claim 1 wherein computing the priority value includes obtaining the priority value from a look-up table based at least in part on the estimated time of arrival.

4. The method of claim 1 further comprising determining an environmental condition wherein the priority value is based at least in part on the environmental condition.

5. The method of claim 1 further comprising determining a road condition wherein the priority value is based at least in part on the road condition.

6. The method of claim 1 wherein the data packet is associated with a long-term evolution communication interface and includes a ProSe Per-Packet Priority value that is based on the priority value.

7. The method of claim 1 wherein the data packet is associated with a 5G new radio communication interface and includes a PC5 Quality of Service (QOS) Identifier (PQI) value that is based on the priority value.

8. The method of claim 1 wherein the data packet is associated with a dedicated short-rage communication wireless communication channel.

9. The method of claim 1 further comprising transmitting the data packet to a roadside unit associated with the waypoint.

10. The method of claim 1 further comprising transmitting the data packet to a cellular base station.

11. The method of claim 1 wherein the waypoint is a dynamic waypoint.

12. The method of claim 11 wherein the dynamic waypoint is an emergency vehicle.

13. An apparatus, comprising:
  at least one memory;
  at least one transceiver;
  at least one processor communicatively coupled to the at least one memory and the at least one transceiver, and configured to:
    determine an estimated time of arrival at a waypoint;
    compute a priority value of data packets for transmission over a cellular vehicle to everything (CV2X) data link based at least in part on the estimated time of arrival at the waypoint, wherein a sooner time of arrival corresponds to a higher priority value; and
    transmit a data packet over a CV2X data link based at least in part on the priority value.

14. The apparatus of claim 13 wherein the at least one processor is further configured to receive map data, wherein the waypoint is included in the map data.

15. The apparatus of claim 13 wherein the at least one processor is further configured to obtain the priority value from a look-up table based at least in part on the estimated time of arrival.

16. The apparatus of claim 13 wherein the at least one processor is further configured to determine an environmental condition wherein the priority value is based at least in part on the environmental condition.

17. The apparatus of claim 13 wherein the at least one processor is further configured to determine a road condition wherein the priority value is based at least in part on the road condition.

18. The apparatus of claim 13 wherein the data packet is associated with a long-term evolution communication interface and the at least on processor is further configured to set a ProSe Per-Packet Priority value based on the priority value.

19. The apparatus of claim 13 wherein the data packet is associated with a 5G new radio communication interface and the at least one processor is further configured to set a PC5 Quality of Service (QOS) Identifier (PQI) value based on the priority value.

20. The apparatus of claim 13 wherein the data packet is associated with a dedicated short-rage communication wireless communication channel.

21. The apparatus of claim 13 wherein the at least one processor is further configured to transmit the data packet to a roadside unit associated with the waypoint.

22. The apparatus of claim 13 wherein the at least one processor is further configured to transmit the data packet to a cellular base station.

23. The apparatus of claim 13 wherein the waypoint is a dynamic waypoint.

24. The apparatus of claim 23 wherein the dynamic waypoint is an emergency vehicle.

25. An apparatus for prioritizing data packets, comprising:
  means for determining an estimated time of arrival at a waypoint;
  means for computing a priority value of data packets for transmission over a cellular vehicle to everything (CV2X) data link based at least in part on the estimated time of arrival at the waypoint, wherein a sooner time of arrival corresponds to a higher priority; and
  means for transmitting a data packet for transmission over a CV2X data link based at least in part on the priority value.

26. The apparatus of claim 25 further comprising means for obtaining the priority value from a look-up table based at least in part on the estimated time of arrival.

27. The apparatus of claim 25 further comprising means for determining an environmental condition wherein the priority value is based at least in part on the environmental condition.

28. The method of claim 1 further comprising means for transmitting the data packet to a roadside unit associated with the waypoint or means for transmitting the data packet to a cellular base station.

29. A non-transitory processor-readable storage medium comprising processor-readable instructions configured to cause one or more processors to prioritize data packets, comprising:

code for determining an estimated time of arrival at a waypoint;

code for computing a priority value of data packets for transmission over a cellular vehicle to everything (CV2X) data link based at least in part on the estimated time of arrival at the waypoint, wherein a sooner time of arrival corresponds to a higher priority value; and code for transmitting a data packet for transmission over a CV2X data link based at least in part on the priority value.

30. The non-transitory processor-readable storage medium of claim 29 further comprising code for setting a ProSe Per-Packet Priority value or a PC5 Quality of Service (QOS) Identifier (PQI) value based on the priority value.

\* \* \* \* \*